(12) United States Patent
Sugiyama

(10) Patent No.: US 11,958,563 B2
(45) Date of Patent: Apr. 16, 2024

(54) STRADDLED VEHICLE

(71) Applicant: YAMAHA HATSUDOKI KABUSHIKI KAISHA, Iwata (JP)

(72) Inventor: Yuichi Sugiyama, Shizuoka (JP)

(73) Assignee: YAMAHA HATSUDOKI KABUSHIKI KAISHA, Iwata (JP)

(*) Notice: Subject to any disclaimer, the term of this patent is extended or adjusted under 35 U.S.C. 154(b) by 333 days.

(21) Appl. No.: 17/487,104

(22) Filed: Sep. 28, 2021

(65) Prior Publication Data

US 2022/0097789 A1    Mar. 31, 2022

(30) Foreign Application Priority Data

Sep. 30, 2020    (JP) .................. 2020-165751

(51) Int. Cl.
*B62J 6/24*    (2020.01)
*B62K 11/02*   (2006.01)

(52) U.S. Cl.
CPC .............. *B62J 6/24* (2020.02); *B62K 11/02* (2013.01)

(58) Field of Classification Search
CPC .................................. B62J 6/24; B62K 11/02
USPC ............................................... 340/432
See application file for complete search history.

(56) References Cited

U.S. PATENT DOCUMENTS

| | | | | |
|---|---|---|---|---|
| 10,019,155 | B2 * | 7/2018 | Takeshi | G06F 3/03547 |
| 2002/0164962 | A1 * | 11/2002 | Mankins | G08G 1/127 |
| | | | | 455/99 |
| 2003/0120453 | A1 * | 6/2003 | Hayashi | B60C 23/0401 |
| | | | | 702/140 |
| 2010/0106345 | A1 * | 4/2010 | Hwang | G07C 5/008 |
| | | | | 701/2 |
| 2013/0106750 | A1 * | 5/2013 | Kurosawa | G06F 3/1454 |
| | | | | 345/173 |
| 2013/0147604 | A1 | 6/2013 | Jones, Jr. | |
| 2015/0019266 | A1 * | 1/2015 | Stempora | G06Q 40/08 |
| | | | | 705/4 |
| 2015/0019967 | A1 * | 1/2015 | Gutentag | H04W 76/10 |
| | | | | 715/719 |
| 2016/0065723 | A1 * | 3/2016 | Jung | H04W 52/0251 |
| | | | | 340/586 |

(Continued)

FOREIGN PATENT DOCUMENTS

| | | | |
|---|---|---|---|
| DE | 102016001468 A1 | 8/2017 | |
| JP | 2008-523745 A | 7/2008 | |

(Continued)

OTHER PUBLICATIONS

Puju, Heinrich: https://www.pcwelt.de/tipps/Android-Handy-heiss-Akkutemperatur-ueber-verborgenes-Statusmenue-abrufen-6549578, Feb. 4, 2013, pp. 1-4, XP055883058.

*Primary Examiner* — Zhen Y Wu
(74) *Attorney, Agent, or Firm* — Rabin & Berdo, P.C.

(57) ABSTRACT

A straddled vehicle including a communication module configured to communicate with a mobile communication terminal, a display that displays infotainment information received by the communication module from the mobile communication terminal, and a controller. The controller is configured to receive temperature data relating to a temperature of the mobile communication terminal from the mobile communication terminal via the communication module, and display an image corresponding to the temperature data on the display.

7 Claims, 7 Drawing Sheets

(56) References Cited

U.S. PATENT DOCUMENTS

| | | | | |
|---|---|---|---|---|
| 2016/0152112 | A1* | 6/2016 | Stetler | B60H 1/00428 |
| | | | | 62/235.1 |
| 2017/0334500 | A1* | 11/2017 | Jarek | G06F 3/0485 |
| 2018/0215435 | A1* | 8/2018 | Iwamoto | G09G 3/36 |
| 2019/0196679 | A1* | 6/2019 | You | G06F 3/0484 |
| 2019/0210682 | A1* | 7/2019 | Palchaudhuri | B62H 5/00 |
| 2019/0327359 | A1* | 10/2019 | Guo | G06F 1/3206 |
| 2020/0130771 | A1 | 4/2020 | Jacobsz Rosier et al. | |
| 2020/0213807 | A1* | 7/2020 | Rentz | G06Q 10/06311 |
| 2020/0407003 | A1* | 12/2020 | Fukuoka | G06V 20/59 |

FOREIGN PATENT DOCUMENTS

| | | |
|---|---|---|
| JP | 2013106192 A | 5/2013 |
| JP | 2013230761 A | 11/2013 |
| JP | 2019073288 A | 5/2019 |
| KR | 20070046315 A | 5/2007 |

* cited by examiner

| TEMPERATURE | TEMPERATURE LEVEL | ICON |
|---|---|---|
| < 40 deg C | 1 | App — 63 |
| 40 – 45 deg C | 2 | |
| 45 – 49 deg C | 3 | App — 64 |
| > 49 deg C | 4 | |

FIG. 7

STRADDLED VEHICLE

CROSS-REFERENCE TO RELATED APPLICATIONS

This application is based on, and claims priority from, Japanese Patent Application No. 2020-165751, filed on Sep. 30, 2020. The contents of the application is incorporated herein by reference.

TECHNICAL FIELD

The present invention relates to a straddled vehicle.

BACKGROUND ART

Conventionally, a straddled vehicle equipped with a display system that communicates with a mobile communication terminal is known (see Japan Laid-open Patent Application Publication No. JP-A-2008-523745). The display system displays the information acquired from the mobile communication terminal on the display mounted on the straddled vehicle. Alternatively, the display system displays a screen for operating the mobile communication terminal on the display. For example, the display system displays a screen for operating a telephone, music playback, or the like on the display. The display system communicates with the mobile communication terminal by wireless communication such as Bluetooth (registered trademark).

SUMMARY OF THE INVENTION

Some mobile communication terminals stop various functions when the mobile communication terminal becomes overheated. For example, a mobile communication terminal stops an application such as music playback while maintaining a wireless communication connection with a display system. In that case, the music is not played, or even if the music is played, the music is stopped immediately, and it is difficult for a user to grasp the cause.

In particular, in a straddled vehicle, the mobile communication terminal is often placed in a high temperature environment because it is exposed to sunlight or the mobile communication terminal is arranged at a position close to a heat source such as an engine. Further, when the mobile communication terminal is placed in the storage box under the seat or in the glove box, it is difficult for the user to see and operate the mobile communication terminal while driving. Therefore, even if the function of the mobile communication terminal is restricted by the overheated state, it is not easy for the user to grasp it.

An object of the present invention is to provide a straddled vehicle that easily notifies a user that a mobile communication terminal is in an overheated state even if the user is driving the straddled vehicle.

A straddled vehicle according to one aspect of the present invention includes a communication module, a display, and a controller. The communication module is configured to communicate with a mobile communication terminal. The display displays infotainment information transmitted from the mobile communication terminal. The controller is configured to receive temperature data related to a temperature of the mobile communication terminal from the mobile communication terminal via the communication module. The controller is configured to display an image corresponding to the temperature data on the display.

In the straddled vehicle according to the present aspect, the image corresponding to the temperature data related to the temperature of the mobile communication terminal acquired from the mobile communication terminal is displayed on the display. Therefore, when the mobile communication terminal becomes overheated, a user can easily grasp that the mobile communication terminal is in the overheated state by the image corresponding to the temperature data.

The image corresponding to the temperature data may be an icon. In this case, the user can easily grasp from the icon that the mobile communication terminal is in the overheated state.

The controller may display the icon on the display in a color corresponding to the temperature data. In this case, the user can easily grasp that the mobile communication terminal is in the overheated state by the color of the icon.

The communication module may wirelessly communicate with the mobile communication terminal. The controller may display an image indicative of a connection state between the mobile communication terminal and the communication module on the display. In this case, the user can easily grasp the connection state between the mobile communication terminal and the communication module from the image indicative of the connection state. Further, the user can distinguish whether the stoppage of the function of the mobile communication terminal is due to the connection state or the overheated state by the image indicative of the connection state and the image corresponding to the temperature data.

The straddled vehicle may further include an input device. The input device may be operable by the user. The controller may display an image for operating the mobile communication terminal on the display. The controller may receive an operation signal indicative of an operation to the input device output from the input device. The controller may transmit a command signal to operate the mobile communication terminal to the mobile communication terminal in response to the operation signal. In this case, the user can operate the mobile communication terminal by operating the input device mounted on the straddled vehicle.

The straddled vehicle may include a vehicle body frame, a seat, a steering device, a front wheel, a drive unit, and a rear wheel. The body frame may include a head pipe. The seat may be located behind the head pipe. The steering device may be rotatably supported by the head pipe. The steering device may include a handle member and a front fork. The handle member may be located above the head pipe. The front fork may be located below the head pipe. The front wheel may be rotatably supported by the front fork. The drive unit may be supported by the vehicle body frame. The rear wheel may be rotatably supported by the drive unit or the vehicle body frame.

BRIEF DESCRIPTION OF THE DRAWINGS

FIG. 7 is a table showing correspondence between temperature levels of a mobile communication terminal and the temperature icons.

DESCRIPTION OF EMBODIMENTS

Figure 1:
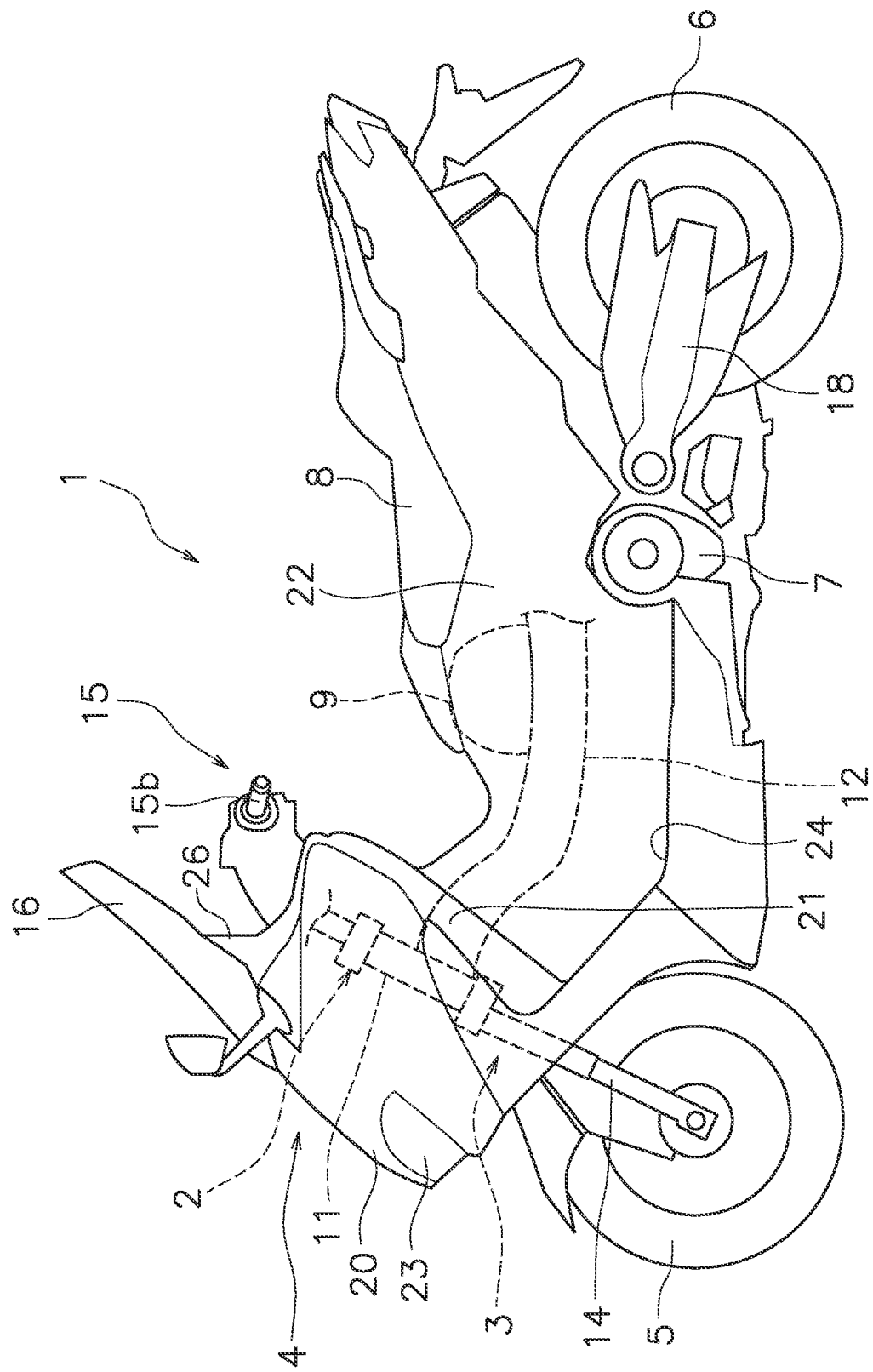
FIG. 1 is a side view of a straddled vehicle according to an embodiment.

Hereinafter, a straddled vehicle according to an embodiment will be described with reference to the drawings. In the following description, terms such as "front and back", "up and down", and "left and right" mean the direction seen from a rider when driving the straddled vehicle. FIG. 1 is a side view of the straddled vehicle 1 according to the embodiment. The straddled vehicle 1 is a scooter. The straddled vehicle 1 includes a vehicle body frame 2, a steering device 3, a vehicle body cover 4, a front wheel 5, a rear wheel 6, a drive unit 7, a seat 8, and a fuel tank 9.

The vehicle body frame 2 includes a head pipe 11 and a main frame 12. The head pipe 11 extends forward and downward. The main frame 12 is connected to the head pipe 11. The main frame 12 extends rearward from the head pipe 11. The fuel tank 9 is supported by the main frame 12.

The steering device 3 is rotatably supported by the head pipe 11. The steering device 3 includes a front fork 14 and a handle member 15. The front fork 14 extends forward and downward. The front fork 14 is arranged below the head pipe 11. The handle member 15 is connected to the front fork 14. A windshield 16 is arranged in front of the handle member 15.

The vehicle body cover 4 covers the vehicle body frame 2. The vehicle body cover 4 includes a front cover 20, a leg shield 21, and a side cover 22. The front cover 20 is arranged in front of and on both sides of the head pipe 11. A headlight 23 is arranged on the front cover 20. The leg shield 21 is arranged behind the front cover 20. A footrest 24 is arranged behind the leg shield 21. The footrest 24 extends in the front-rear direction. In FIG. 1, only the left footrest 24 is illustrated, but the right footrest is arranged symmetrically with the left footrest 24. The side cover 22 is arranged on both sides of the main frame 12.

The front wheel 5 is rotatably supported by the front fork 14. The rear wheel 6 is rotatably supported by a swing arm 18. The swing arm 18 is rotatably supported by the drive unit 7 or the vehicle body frame 2. The drive unit 7 is arranged below the seat 8. The drive unit 7 is supported by the main frame 12. The drive unit 7 generates a driving force for rotating the rear wheel 6. The drive unit 7 includes, for example, an internal combustion engine. Alternatively, the drive unit 7 may include an electric motor.

Figure 2:
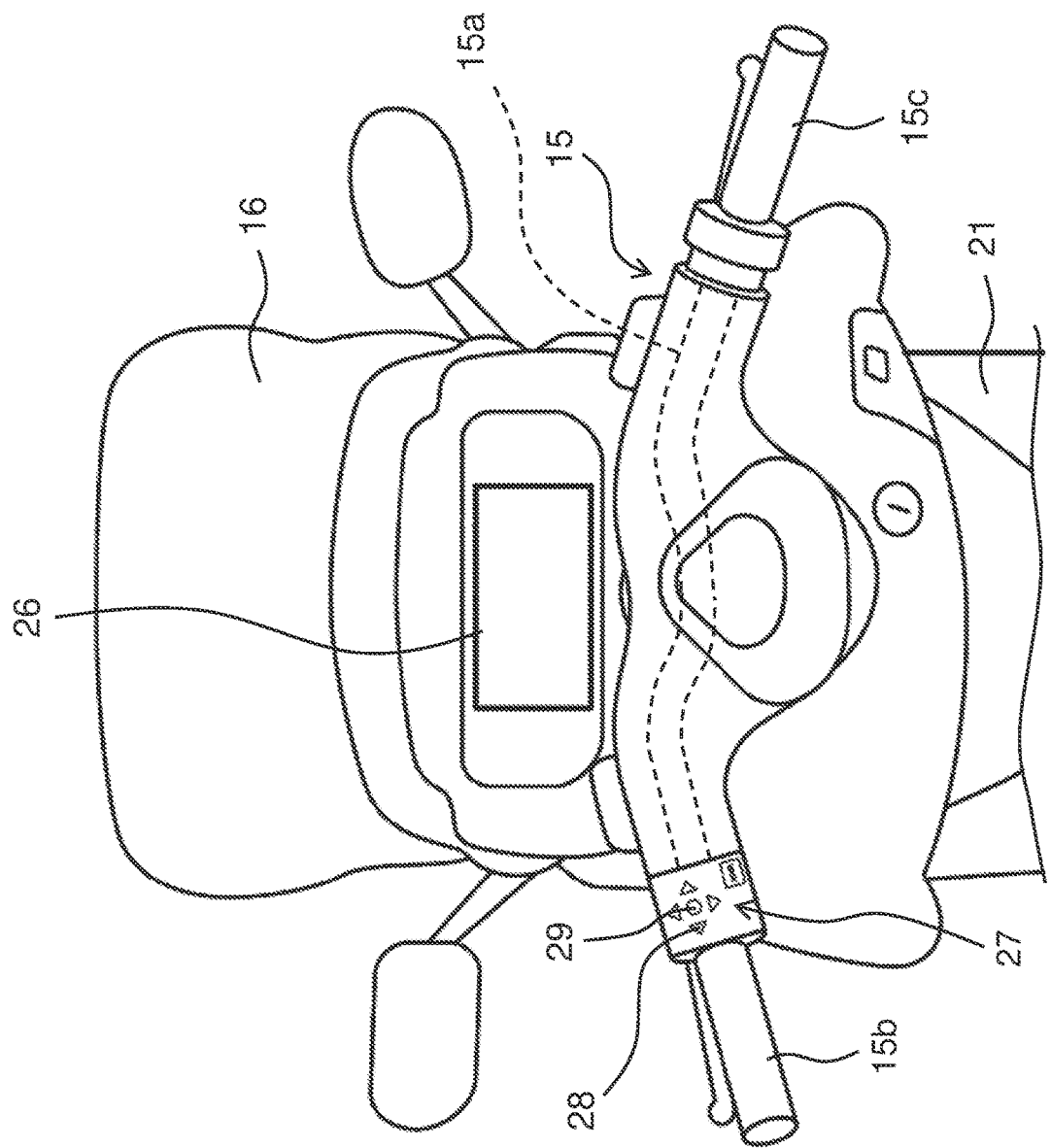
FIG. 2 is a rear view showing a structure of a handle member and its surroundings.

FIG. 2 is a rear view showing a configuration of the handle member 15 and its surroundings. As illustrated in FIG. 2, the handle member 15 includes a handle bar 15a and a pair of grips 15b and 15c. The handle bar 15a extends in the left-right direction. The grips 15b and 15c are attached to both ends of the handle bar 15a.

The straddled vehicle 1 includes a display 26. The display 26 is arranged in front of the handle member 15. The display 26 is, for example, an LCD (Liquid Crystal Display), an OLED (Organic Light Emitting Diode) display, or an OELD (Organic Electroluminescence Display). However, the display 26 may be of another type. The display 26 displays an image according to an image signal input to the display 26.

The straddled vehicle 1 includes an input device 27. In this embodiment, the input device 27 is attached to the handle bar 15a. The input device 27 is arranged adjacent to the grip 15b. The input device 27 is operable by the user. The input device 27 outputs an operation signal indicative of an operation by the user. The input device 27 includes a selection switch 28 and a determination switch 29. The selection switch 28 and the determination switch 29 may be separate from each other. Alternatively, the selection switch 28 and the determination switch 29 may be integrated.

Figure 3:
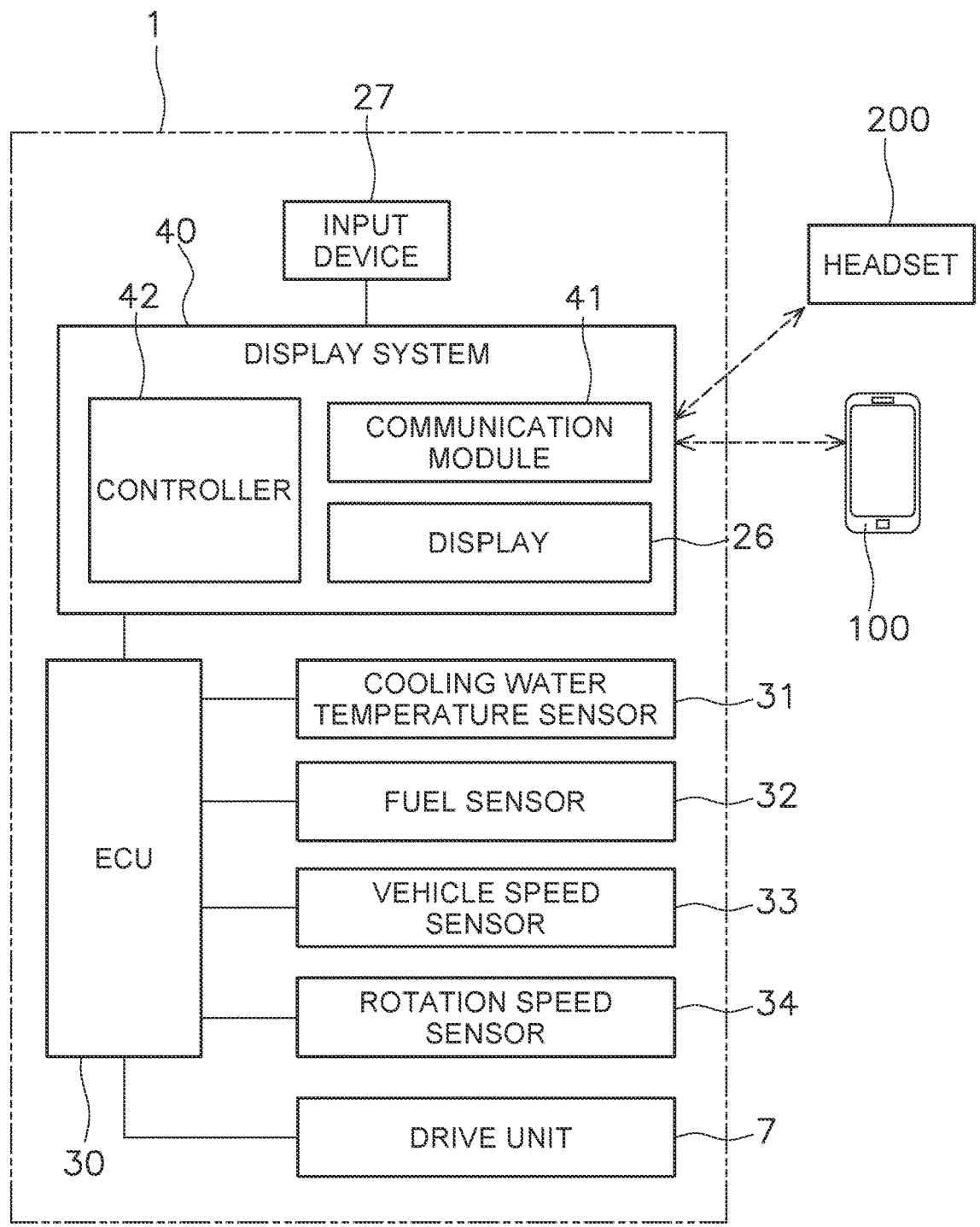
FIG. 3 is a block diagram showing a control system of the straddled vehicle.

FIG. 3 is a block diagram showing a control system of the straddled vehicle 1. As illustrated in FIG. 3, the straddled vehicle 1 includes an engine control unit (ECU) 30. The ECU 30 includes a processor and a memory. The ECU 30 stores a program and data for controlling the straddled vehicle 1, and controls the straddled vehicle 1 according to the program and the data. For example, the ECU 30 controls the output of the drive unit 7. When the drive unit 7 includes an engine, the ECU 30 controls the ignition timing of the engine.

The ECU 30 is connected to a plurality of sensors mounted on the straddled vehicle 1. The plurality of sensors detect vehicle information indicative of a state of the straddled vehicle 1. For example, the plurality of sensors include a cooling water temperature sensor 31, a fuel sensor 32, a vehicle speed sensor 33, and a rotation speed sensor 34. The cooling water temperature sensor 31 detects a temperature of cooling water of the drive unit 7. The fuel sensor 32 detects a remaining amount of fuel in the fuel tank 9. The vehicle speed sensor 33 detects a traveling speed of the straddled vehicle 1. The rotation speed sensor 34 detects an output rotation speed of the drive unit 7. For example, when the drive unit 7 includes an engine, the rotation speed sensor 34 detects an engine speed. Each of the plurality of sensors outputs a detection signal indicative of the detected vehicle information.

The straddled vehicle 1 includes a display system 40. The display system 40 displays the vehicle information described above on the display 26. Further, the display system 40 performs data communication with a mobile communication terminal 100. For example, an application for communicating with the display system 40 is installed in the mobile communication terminal 100. The mobile communication terminal 100 is, for example, a smartphone or a tablet. The mobile communication terminal 100 is connectable to a mobile communication network such as 3G, 4G, or 5G. The mobile communication terminal 100 may be connectable to a communication network such as a wireless local area network (LAN).

The display system 40 includes a communication module 41, a controller 42, and the display 26 described above. The communication module 41 communicates with the mobile communication terminal 100. For example, the communication module 41 communicates with the mobile communication terminal 100 by wireless communication such as Bluetooth (registered trademark). Alternatively, the communication module 41 may communicate with the mobile communication terminal 100 by wire. The communication module 41 communicates with the headset 200 by wireless communication.

The controller 42 includes a processor and a memory. The controller 42 may include an auxiliary storage device such as a solid-state drive (SSD) or n hard disk drive (HDD). The controller 42 is communicably connected to the ECU 30. The controller 42 receives the vehicle information from the ECU 30. The controller 42 is communicably connected to the communication module 41. The controller 42 receives infotainment information, which will be described later, from the mobile communication terminal 100 via the communication module 41. The controller 42 transmits a command signal to the mobile communication terminal 100 via the communication module 41. The controller 42 is communicably connected to the display 26. The controller 42 outputs the image signal to the display 26 to display the image on the display 26.

Figure 4:
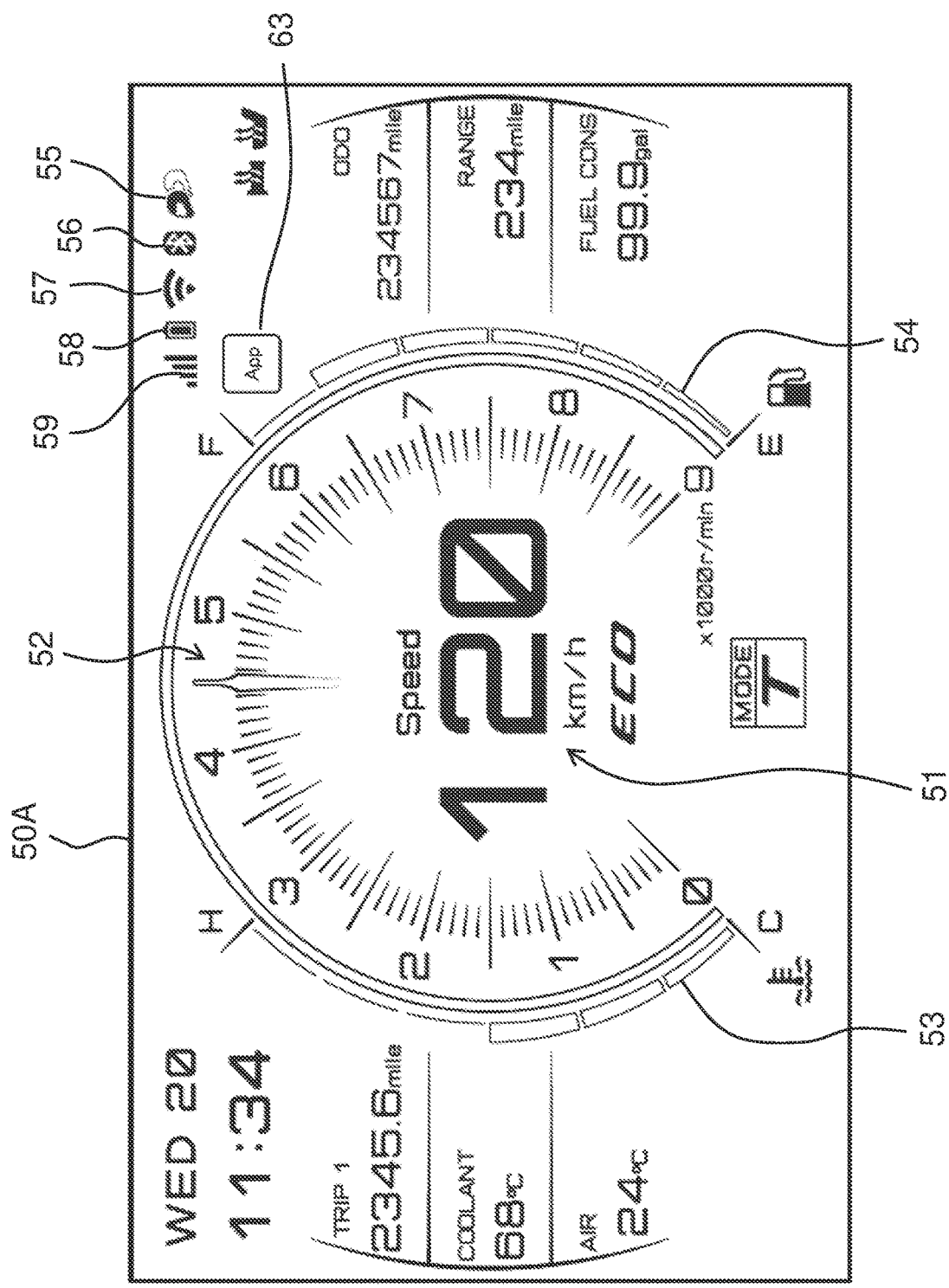
FIG. 4 is a diagram showing an image including a first temperature icon.

FIG. 4 is a diagram showing an image 50A displayed on the display 26. The image 50A includes the vehicle information. For example, the vehicle information is indicated by a speedometer 51, a tachometer 52, a cooling water thermometer 53, and a fuel gauge 54. The controller 42 displays the speedometer 51, the tachometer 52, the cooling water thermometer 53, and the fuel gauge 54 on the display 26 based on the received vehicle information.

The image 50A includes an icon 55 indicative of a connection state between the communication module 41 and the headset 200. The controller 42 displays the icon 55 on the display 26 when the connection between the communication module 41 and the headset 200 is established. The controller 42 turns off the icon 55 when the connection between the communication module 41 and the headset 200 is not established.

The image 50A includes the infotainment information transmitted from the mobile communication terminal 100. The infotainment information includes an icon 56 indicative of a connection state between the mobile communication terminal 100 and the communication module 41. The controller 42 displays the icon 56 on the display 26 when the connection between the mobile communication terminal 100 and the communication module 41 is established. The controller 42 turns off the icon 56 when a connection function between the mobile communication terminal 100 and the communication module 41 is turned off. When the connection function between the mobile communication terminal 100 and the communication module 41 is turned on, but the connection between the mobile communication terminal 100 and the communication module 41 is not established, the controller 42 displays an icon different from the icon 56 on the display 26.

The infotainment information may include other information about the mobile communication terminal 100. For example, the controller 42 may display an icon indicative of an incoming call on the display 26. The controller 42 may display an icon indicative of reception of a message such as E-mail or SMS on the display 26. The controller 42 may display an icon indicative of a notification regarding the SNS on the display 26. The infotainment information may include a navigation guidance screen.

The infotainment information includes an icon 57 indicative of a connection state between the mobile communication terminal 100 and the wireless LAN. The controller 42 displays the icon 57 on the display 26 in a manner corresponding to the connection state between the mobile communication terminal 100 and the wireless LAN. The controller 42 turns off the icon 57 when the connection function between the mobile communication terminal 100 and the wireless LAN is turned off. When the connection function between the mobile communication terminal 100 and the wireless LAN is turned on, but the connection between the mobile communication terminal 100 and the wireless LAN is not established, the controller 42 displays an icon different from the icon 57 on the display 26.

The infotainment information includes an icon 58 indicative of a remaining battery level or a charging state of the mobile communication terminal 100. The controller 42 displays the icon 58 on the display 26 in a manner corresponding to the remaining battery level or the charging state.

The infotainment information includes an icon 59 indicative of a connection state between the mobile communication terminal 100 and the mobile communication network. The controller 42 displays the icon 59 on the display 26 in a manner corresponding to a connection strength between the mobile communication terminal 100 and the mobile communication network.

Figure 5:
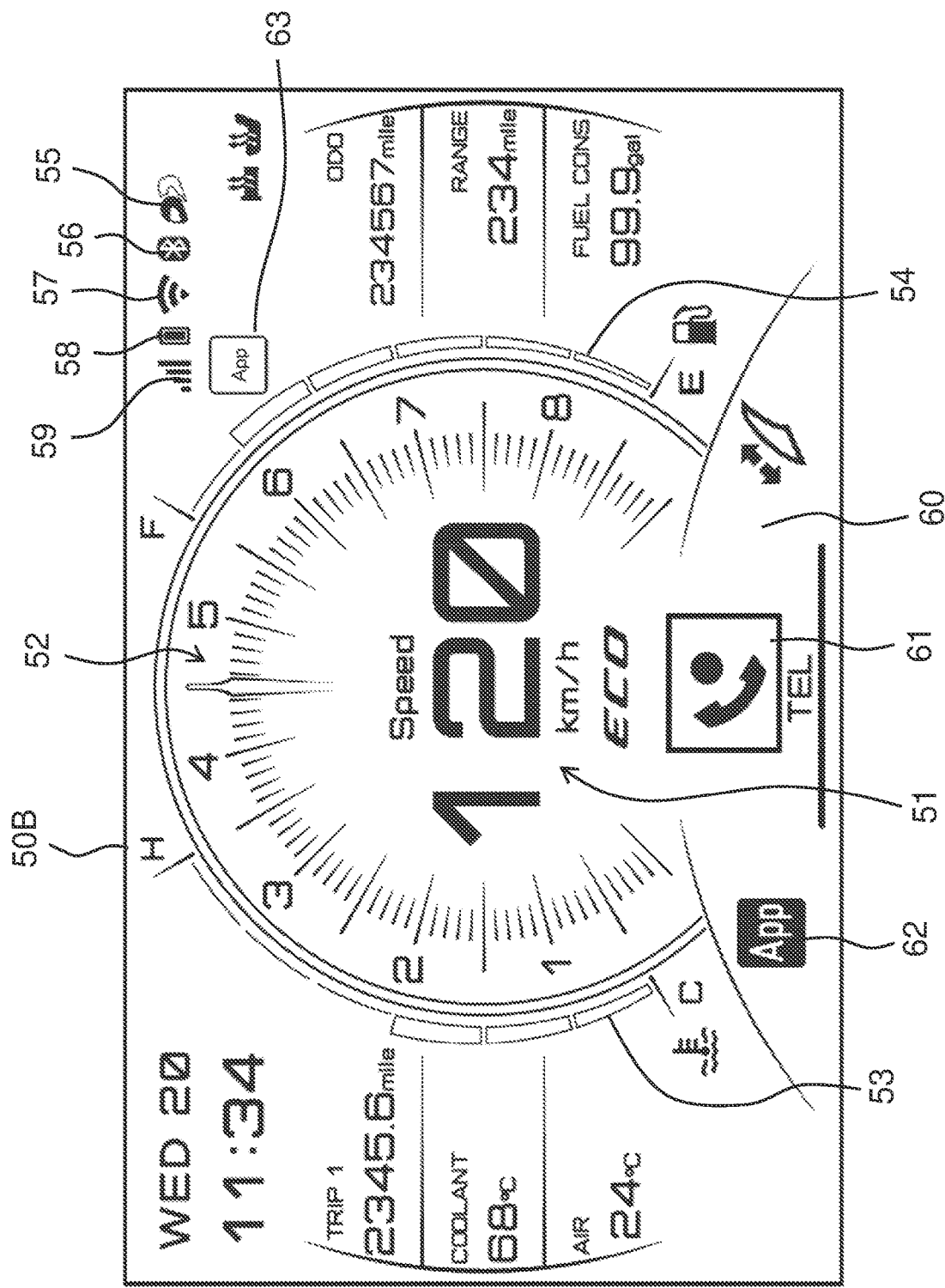
FIG. 5 is a diagram showing an image including an operation screen.

FIG. 5 is a diagram showing another image 50B displayed on the display 26. The image 50B includes an operation screen 60 for operating the mobile communication terminal 100. The user calls the operation screen 60 on the display 26 by operating the input device 27. The operation screen 60 includes icons indicative of applications of the mobile communication terminal 100. The controller 42 transmits a command signal for operating the mobile communication terminal 100 to the mobile communication terminal 100 in response to the operation signal from the input device 27. As a result, the user can launch and operate the desired application by selecting and deciding on the icon by the input device 27.

For example, the operation screen 60 includes an icon 61 indicative of an incoming or outgoing call. The operation screen 60 includes an icon 62 indicative of another application such as music. Audio related to these applications is output from the headset 200. Further, the user's voice is input to the mobile communication terminal 100 via the headset 200.

Figure 6:
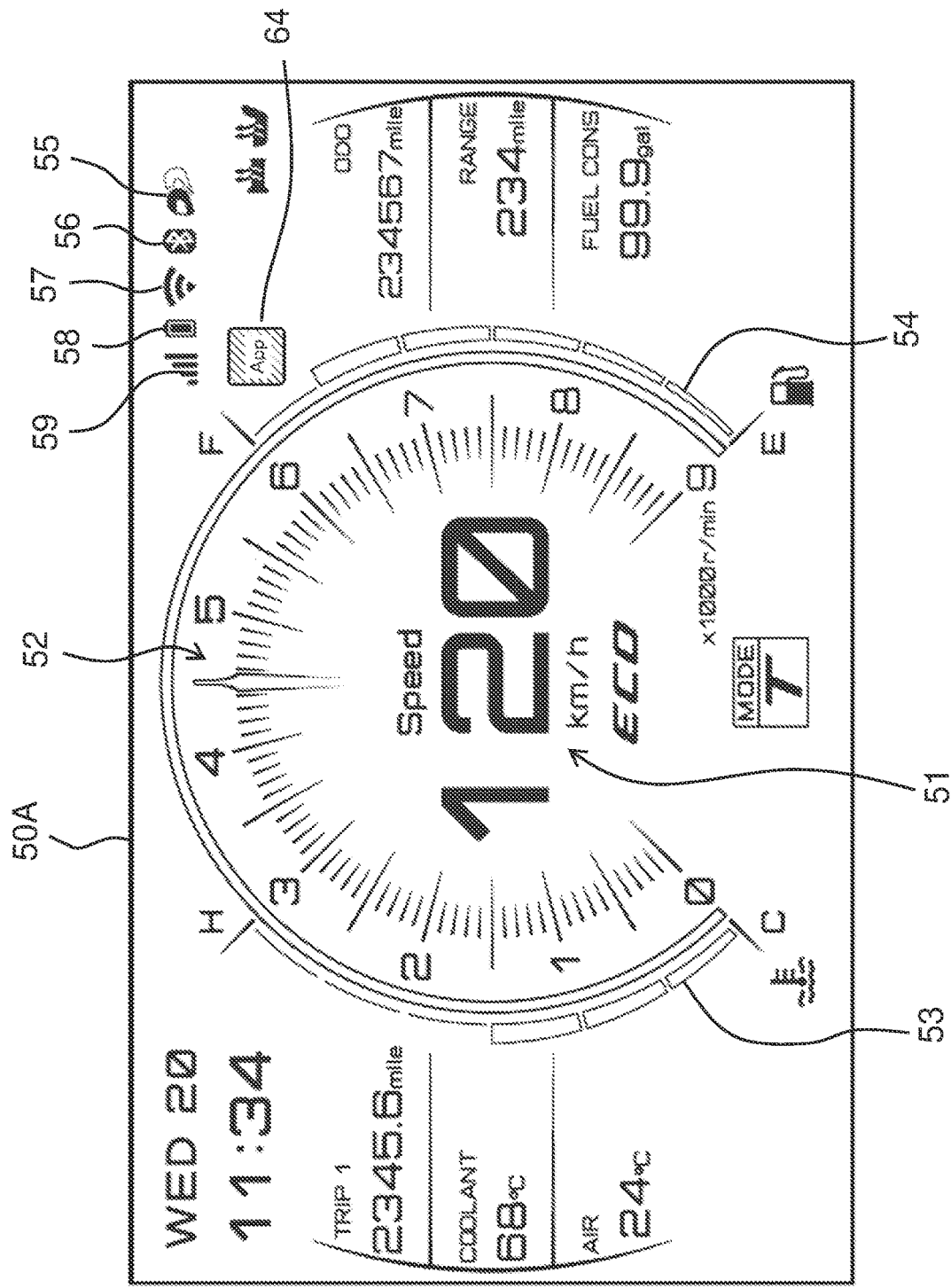
FIG. 6 is a diagram showing an image including a second temperature icon.

As illustrated in FIGS. 4 and 6, the image 50A includes temperature icons 63 and 64 indicative of temperature data. The temperature data is information related to the temperature of the mobile communication terminal 100. As illustrated in FIG. 7, the mobile communication terminal 100 outputs a temperature level corresponding to the temperature of the mobile communication terminal 100 as the temperature data. For example, when the temperature of the mobile communication terminal 100 is lower than 40° C., the mobile communication terminal 100 outputs the temperature data indicative of a level 1. When the temperature of the mobile communication terminal 100 is from 40° C. to 45° C., the mobile communication terminal 100 outputs the temperature data indicative of a level 2. When the temperature of the mobile communication terminal 100 is from 45° C. to 49° C., the mobile communication terminal 100 outputs the temperature data indicative of a level 3. When the temperature of the mobile communication terminal 100 is higher than 45° C., the mobile communication terminal 100 outputs the temperature data indicative of a level 4. The numerical values of the temperature range illustrated in FIG. 7 are examples, and the temperature range indicated by each temperature level is not limited to these numerical values.

The controller 42 receives the temperature data from the mobile communication terminal 100 via the communication module 41. The controller 42 displays the temperature icons 63 and 64 corresponding to the temperature data on the display 26. When the temperature level is the level 1, the controller 42 displays the first temperature icon 63 on the display 26, as illustrated in FIG. 4. When the temperature level is the level 2 or higher, the controller 42 displays the second temperature icon 64 on the display 26 as illustrated in FIG. 6. The color of the second temperature icon 64 is different from the color of the first temperature icon 63. That is, the controller 42 displays the temperature icon on the display 26 in a color corresponding to the temperature data. In the drawing, the difference in color between the icons 63 and 64 is represented by the presence or absence of hatching. The first temperature icon 63 indicates that the temperature of the mobile communication terminal 100 is normal. The second temperature icon 64 indicates that the temperature of the mobile communication terminal 100 is in an overheated state.

In the straddled vehicle 1 according to the present embodiment described above, the temperature icons 63 and 64 corresponding to the temperature data related to the temperature of the mobile communication terminal 100 acquired from the mobile communication terminal 100 are displayed on the display 26. Therefore, when the mobile communication terminal 100 becomes overheated, the user can easily grasp that the mobile communication terminal 100 is in the overheated state by the temperature icons 63 and 64.

Although one embodiment of the present invention has been described above, the present invention is not limited to the above embodiment, and various modifications can be made without departing from the gist of the invention.

The straddled vehicle 1 is not limited to the scooter, and may be another vehicle such as an underbone type, a moped, or a street motorcycle. The shapes or arrangements of the vehicle body frame 2, the vehicle body cover 4, the drive unit 7, the seat 8, and the fuel tank 9 are not limited to those of the above embodiment, and may be changed.

The shape or arrangement of the input device 27 is not limited to that of the above embodiment, and may be changed. For example, the input device 27 may be arranged adjacent to the grip 15c. Alternatively, the input device 27 may be arranged in a part other than the handle member 15.

The controller 42 may be composed of a plurality of controllers. For example, communication with the mobile communication terminal 100 and control of the display 26 may be executed by controllers that are separate from each other. A part or all of the display 26, the communication module 41, and the controller 42 may be separate from each other or may be integrated with each other. The image corresponding to the temperature data is not limited to the temperature icons 63 and 64, and may be represented in other manners. For example, the image corresponding to the temperature data may be a text corresponding to the temperature data. The text may be displayed in a pop-up window. The controller 42 may display icons having different shapes on the display 26 according to the temperature data. Alternatively, the controller 42 may display text of different words on the display 26 according to the temperature data.

The number of types of temperature icons is not limited to two, and may be more than two. For example, the controller 42 may display three or more different colored temperature icons on the display 26 corresponding to the temperature level. The number of temperature levels is not limited to four and may be less than four or more than four.

The shapes or arrangements of the images 50A and 50B displayed on the display 26 are not limited to those of the above embodiment, and may be changed. The vehicle information displayed on the display 26 is not limited to that of the above embodiment, and may be changed. The infotainment information displayed on the display 26 is not limited to that of the above embodiment, and may be changed.

REFERENCE SIGNS LIST

2: Vehicle body frame, 3: Steering device, 5: Front wheel, 6: Rear wheel, 7: Drive unit, 8: Seat, 11: Head pipe, 14: Front fork, 15: Handle member, 26: Display, 27: Input device, 41: Communication module, 42: Controller, 63, 64: Temperature icon

The invention claimed is:

1. A straddled vehicle comprising:
   a communication module configured to communicate with a mobile communication terminal;
   a display that displays infotainment information received by the communication module from the mobile communication terminal; and
   a controller configured to
      receive temperature data relating to a temperature of the mobile communication terminal from the mobile communication terminal via the communication module, and
      display an image corresponding to the temperature data on the display.

2. The straddled vehicle according to claim 1, wherein the image corresponding to the temperature data includes an icon or a text.

3. The straddled vehicle according to claim 2, wherein the image corresponding to the temperature data includes the icon, and
   the controller is configured to display the icon on the display in a color corresponding to the temperature data.

4. The straddled vehicle according to claim 1, wherein the communication module wirelessly communicates with the mobile communication terminal, and
   the controller is configured to display, on the display, another image indicative of a connection state between the mobile communication terminal and the communication module.

5. The straddled vehicle according to claim 1, further comprising:
   an input device that is operable by a user, wherein
   the controller is configured to
      display another image for operating the mobile communication terminal on the display,
      receive an operation signal, indicative of an operation by the user, outputted from the input device, and
      send a command signal for operating the mobile communication terminal to the mobile communication terminal in response to the operation signal.

6. The straddled vehicle according to claim 1, further comprising:
   a vehicle body frame including a head pipe;
   a seat arranged behind the head pipe in a front-rear direction of the straddled vehicle;
   a steering device rotatably supported by the head pipe, the steering device including
      a handle member arranged above the head pipe, and
      a front fork arranged below the head pipe
   in an up-down direction of the straddled vehicle;
   a front wheel rotatably supported by the front fork;
   a drive unit supported by the vehicle body frame; and
   a rear wheel rotatably supported by the drive unit or the vehicle body frame.

7. The straddled vehicle according to claim 1, wherein the controller includes
   a processor, and
   a non-transitory memory containing program instructions, execution of which by the processor causes the controller to receive the temperature data and to display the image corresponding to the temperature data on the display.

* * * * *